(12) United States Patent
Ono (10) Patent No.: US 7,469,234 B2
(45) Date of Patent: Dec. 23, 2008

(54) VALUE INFORMATION MANAGEMENT SYSTEM AND METHOD THEREFOR

(75) Inventor: Yoshihiro Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 556 days.

(21) Appl. No.: 11/039,612

(22) Filed: Jan. 19, 2005

(65) Prior Publication Data

US 2005/0165503 A1    Jul. 28, 2005

(30) Foreign Application Priority Data

Jan. 28, 2004    (JP) .............................. 2004-019123

(51) Int. Cl.
G06Q 30/00    (2006.01)
(52) U.S. Cl. .............................. 705/67; 705/65; 705/66; 705/77
(58) Field of Classification Search .................. 705/26, 705/65, 66, 67, 76, 77
See application file for complete search history.

(56) References Cited

U.S. PATENT DOCUMENTS

| | | | | |
|---|---|---|---|---|
| 6,216,227 | B1 * | 4/2001 | Goldstein et al. | 713/172 |
| 6,382,357 | B1 * | 5/2002 | Morrison et al. | 186/61 |
| 6,805,284 | B2 * | 10/2004 | Himmel et al. | 235/375 |
| 6,842,741 | B1 * | 1/2005 | Fujimura | 705/59 |
| 6,965,914 | B2 * | 11/2005 | Dowling | 709/203 |
| 7,093,130 | B1 * | 8/2006 | Kobayashi et al. | 713/176 |
| 7,114,179 | B1 * | 9/2006 | Ritter et al. | 726/7 |
| 2001/0032250 | A1 * | 10/2001 | Kusakabe et al. | 709/217 |
| 2002/0004762 | A1 * | 1/2002 | Izumoto | 705/26 |
| 2002/0014529 | A1 * | 2/2002 | Tanaka | 235/449 |

(Continued)

FOREIGN PATENT DOCUMENTS

JP    2002-259879    9/2002

(Continued)

OTHER PUBLICATIONS

Anon., "New Moves for Smart Card Supplier," Precision Marketing, p. 6, Dec. 4, 1995.*

(Continued)

*Primary Examiner*—Nicholas D Rosen
(74) *Attorney, Agent, or Firm*—Scully, Scott, Murphy & Presser, P.C.

(57) ABSTRACT

A value information management system includes, a value exchange card, user terminal, and management server. The value exchange card stores value information representing the value of a product/service purchased through a network, together with ID information. The user terminal includes a medium information reading unit which reads the information of the value exchange card and an information transmitting unit which transmits the information read by the medium information reading unit through the network. The management server includes an information storage management unit which receives the information transmitted from the user terminal and stores/manages ID information and value information in association with each other, and a value information search unit which searches for the value information corresponding to the ID information in response to an inquiry sent through the network and returns the value information. A value information management method is also disclosed.

12 Claims, 6 Drawing Sheets

U.S. PATENT DOCUMENTS

| | | |
|---|---|---|
| 2002/0087406 A1 | 7/2002 | Hashimoto et al. |
| 2002/0111909 A1* | 8/2002 | Lee .............................. 705/50 |
| 2002/0143624 A1 | 10/2002 | Catan |
| 2002/0162885 A1* | 11/2002 | Himmel et al. ............. 235/380 |
| 2003/0119485 A1* | 6/2003 | Ogasawara ................. 455/411 |
| 2003/0127525 A1* | 7/2003 | Stromberg .................. 235/492 |
| 2003/0229790 A1* | 12/2003 | Russell ....................... 713/172 |
| 2004/0060988 A1* | 4/2004 | Sakamoto et al. ........... 235/492 |
| 2005/0246281 A1* | 11/2005 | Gakuhari et al. .............. 705/52 |
| 2007/0033397 A1* | 2/2007 | Phillips, II et al. .......... 713/168 |

FOREIGN PATENT DOCUMENTS

| | | |
|---|---|---|
| JP | 2003-132272 | 5/2003 |
| WO | WO-02065366 A1 * | 8/2002 |

OTHER PUBLICATIONS

Anon., "Verifone Going in the Home?" Retail Delivery Systems News, vol. 1, No. 22, Oct. 25, 1996.*

Anon., "France: Motorola Presents Timeports P7389E," Le Monde, Interactif, P. VI, Feb. 16, 2000.*

Anon., "7-Eleven's Smart Card Loyalty Plans," Card Fax, vol. 2000, No. 63, p. 1, Mar. 31, 2000.*

Anon., "ePacific, Inc., Completes Private Equity Placement," PR Newswire, Apr. 7, 2000.*

Anon., "Stored-Value Cards Target Youth," Computerworld Hong Kong, p. 2, Aug. 11, 2000.*

Anon., "KDDI to Field-Test 3G Moblie Phones as Credit Cards," Nikkei Business Daily Online, Apr. 19, 2002.*

* cited by examiner

USER TERMINAL 1

FIG.5A

SHOP TERMINAL 2

FIG.5B

MANAGEMENT SERVER 5

FIG.5C

USER TERMINAL 1B

FIG.6A

MANAGEMENT SERVER 5A

FIG.6B

VALUE INFORMATION MANAGEMENT SYSTEM AND METHOD THEREFOR

BACKGROUND OF THE INVENTION

The present invention relates to a value information management system and its method and, more particularly, to a value information management system and its method which manage the value information of a product or service itself which is purchased by a purchaser through a network such as the Internet and make the information exchangeable.

Recently, as disclosed in Japanese Patent Laid-Open Nos. 2002-259879 (reference 1) and Japanese Patent Laid-Open No. 2003-132272 (reference 2), electronic commerce, i.e., so-called Internet commerce, using a network such as the Internet has been realized. According to net shopping as a form of Internet commerce, a user connects a terminal connected to a network to a net shopping site by communication using the network, and purchases a product or service. After the purchase, there is a time until the product is delivered or the service is received before the product or service is actually provided for the purchaser. During this period, the value of the product or service purchased by the purchaser is locked in the network from the viewpoint of the purchaser. That is, the purchaser cannot separate the value from the network and freely carry it with him/her.

When, for example, the user of a cellular phone terminal purchases a service (a ticket for a concert) by net shopping, the purchased service information (value) is stored in the memory in the cellular phone terminal. If the purchaser cannot receive the service (cannot go to the concert) on the day when the service should be provided (on the day of the concert), he/she needs to provide the purchased service for a substitute (to let a substitute go to the concert). In this case, however, the substitute needs to have a terminal capable of performing value exchange with the cellular phone terminal owned by the purchaser by wireless communication (infrared communication, wireless LAN, Bluetooth, or the like); otherwise, the purchaser cannot let the substitute receive the service. There is also a method of making the substitute bring the cellular phone terminal of the purchaser with him/her to the concert hall. However, such a method is ethically inappropriate in consideration of the application purpose and social character of cellular phones.

As described above, in conventional net shopping, since all purchased information is locked in the network, a purchaser cannot carry a purchased value itself with him/her or transfer the value to someone else before the value is converted into the actually purchased product or service.

SUMMARY OF THE INVENTION

It is an object of the present invention to provide a value information management system and its method which can separate value (right to exchange for a product or right to use a service) information of a product or service purchased by net shopping or the like from a network to allow the value information to be physically carried or transferred.

In order to achieve the above object, according to the present invention, there is provided a value information management system comprising a storage medium which stores value information representing a value of a product/service purchased through a network, together with ID information, a first user terminal which includes reading means for reading information of the storage medium and transmitting means for transmitting the information read by the reading means through the network, and a management server which includes storage management means for receiving the information transmitted from the first user terminal and storing/managing ID information and value information in association with each other, and search means for searching for the value information corresponding to the ID information in response to an inquiry sent through the network and returning the value information.

The function of the present invention will be described below. Value information representing the value (right to exchange for a product or right to use a service) of a product or service itself purchased through a network is stored in a value exchange card which is a recording medium, together with ID information. The stored information of this value exchange card is transmitted to an information management server which manages this card to be stored/managed. This makes it possible to transfer the right to exchange for a product or the right to use a service, which is the value of the product or service itself, i.e., to set it in an exchangeable state.

In this exchangeable state, when, for example, the purchaser himself/herself or another person who has taken over the value exchange card is actually provided with the product or service (exchanges for the product or is provided with the service), the information management server which has received the corresponding notification discards the contents of the stored information to restore the exchangeable state to the unexchangeable state. This makes it possible to manage a value exchange card and stored information in the management server in association with each other. Therefore, the value of a product or service purchased by net shopping or the like can be separated from the network, and a person can freely carry the value, thereby allowing the transfer of the right to exchange for a product or the right to use a service.

DESCRIPTION OF THE PREFERRED EMBODIMENTS

Figure 1:
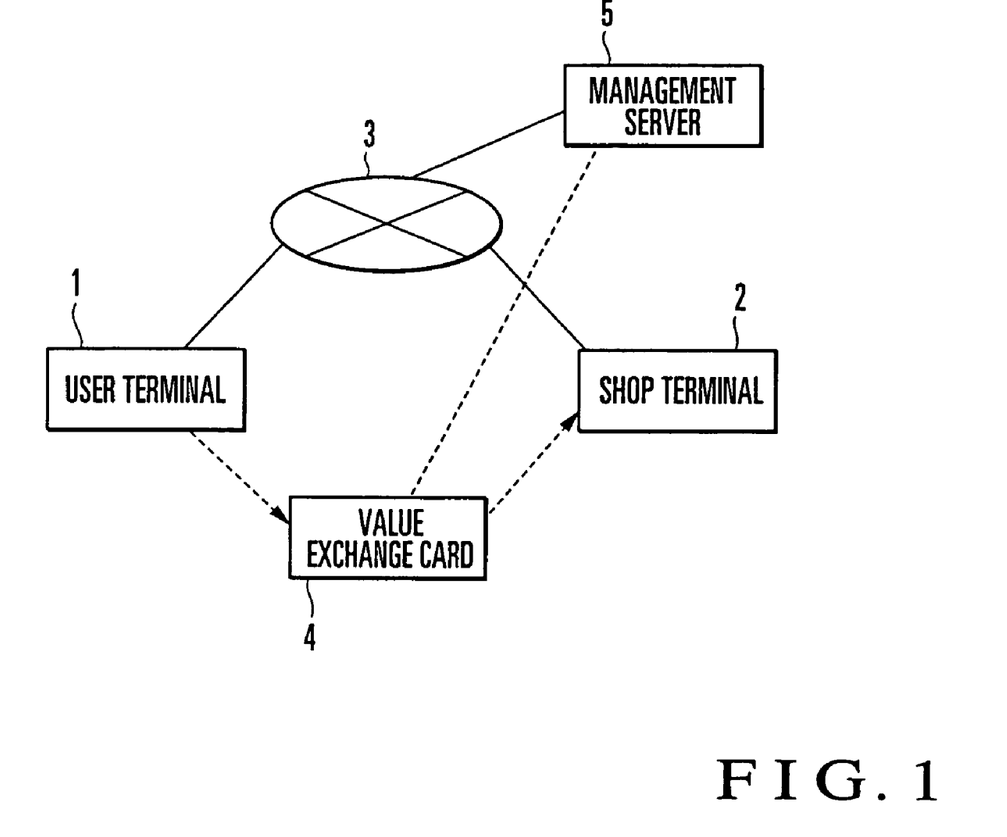
FIG. 1 is a schematic block diagram of a value information management system according to the first embodiment of the present invention.
Figure 2:
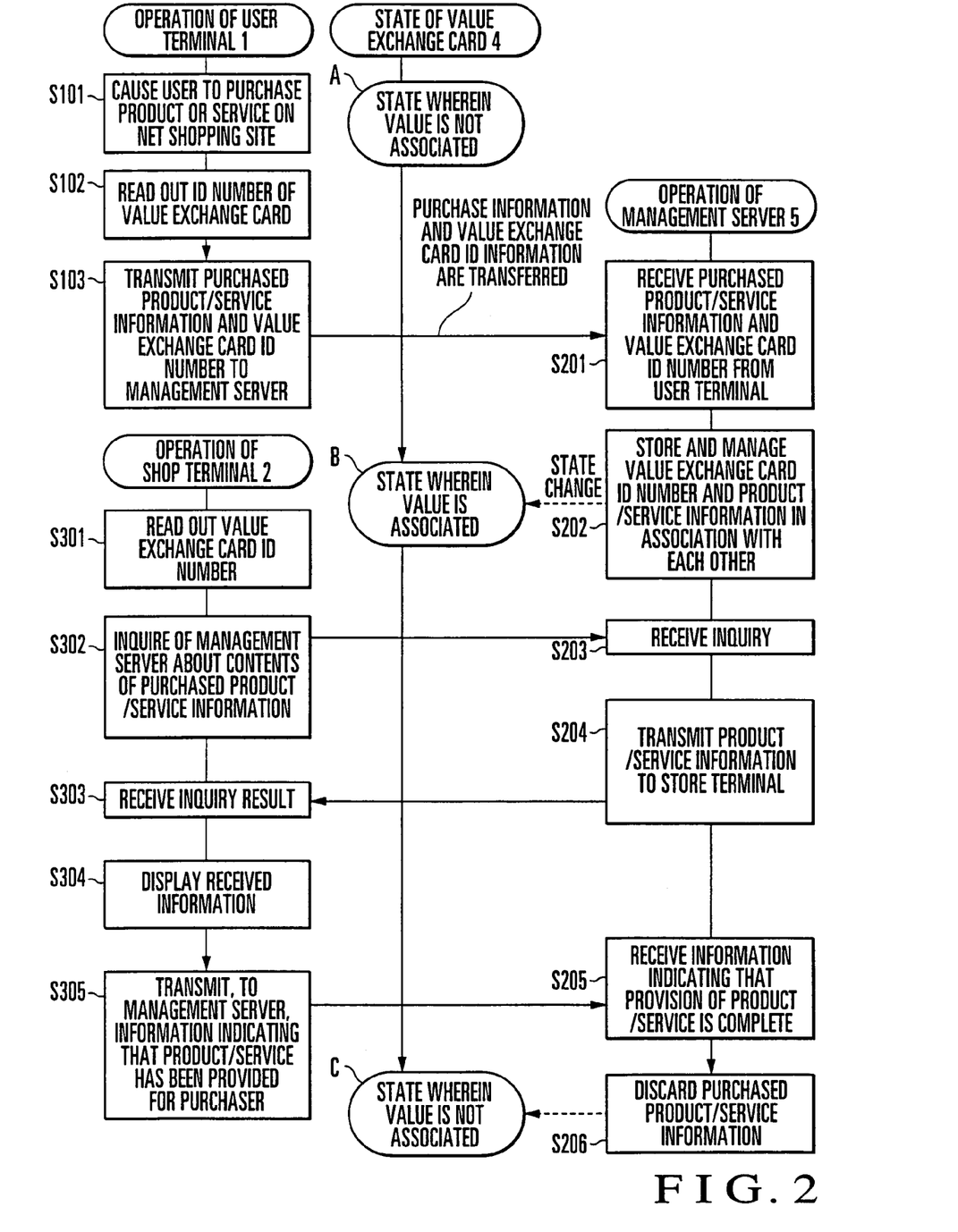
FIG. 2 is a flowchart showing the operation of the value information management system shown in FIG. 1.

A value information management system according to the first embodiment of the present invention will be described below with reference to FIGS. 1 and 2. As shown in FIG. 1, the value information management system according to this embodiment is comprised of a user terminal 1 such as a cellular phone terminal owned by a purchaser, a shop terminal 2 installed in a service providing shop, a network 3 such as the Internet to which the user terminal 1 and shop terminal 2 are connected, a value exchange card 4 which exchanges stored value information between the user terminal 1 and the shop terminal 2, and a management server 5 which communicates with the user terminal 1 and shop terminal 2 through the network 3.

The value exchange card 4 is a card in which an IC chip storing the ID number unique to the card is embedded. The ID number stored in the IC chip can be externally read out. The value exchange card 4 can be realized by an RF tag card using an RFID (Radio Frequency Identification) technique. The user terminal 1 has a function of reading out the ID number (to be referred to as a value card ID hereinafter) of the value exchange card 4 and a function of purchasing a product or service (to be referred to as a product/service hereinafter) by communicating with a product or service purchase server (not shown). These functions are basic functions for net shopping, and the descriptions of references 1 and 2 are incorporated in this specification.

The shop terminal 2 has a function of reading out a value exchange card ID and a function of inquiring of the management server 5 about the contents of a product/service associated with the readout value exchange card ID.

The management server 5 has a function of managing information associated with each value exchange card ID. Each associated information represents the contents associated with each value exchange card 4. For example, such information is information about the product/service purchased by the net shopping function of the user terminal 1. The management server 5 also has a function of communicating with the user terminal 1 to receive the value exchange card ID read out by the user terminal 1 and information about the product or service purchased by the user terminal 1.

The operation of the value information management system having this arrangement will be described with reference to FIG. 2. Note that when the information of a purchased product/service, a value exchange card ID number, or the like is to be transmitted/received through the network, an appropriate protocol, encryption scheme, or the like necessary for reliable delivery is used.

The user of the user terminal 1 purchases a product/service on a net shopping site by operating the user terminal 1 (step S101). In this case, the user may complete payment on the net shopping site or may make payment at another time, e.g., when the purchaser visits the shop.

Note that the details of operation on the net shopping site is not directly relevant to the gist of the present invention, and hence a detailed description thereof will be omitted. The user terminal may be a terminal capable of receiving broadcasts. For example, the user terminal allows the purchaser who is to purchase a product/service introduced through a TV broadcast to move to the net shopping site associated with the broadcast information.

The user terminal 1 loads the value exchange card ID for the association of the purchased product/service from the value exchange card 4 inserted into the apparatus (step S102). In this case, it suffices if a plurality of value exchange cards 4 can be stored in the user terminal 1, and only one of the cards is extracted to load its value exchange card ID.

The user terminal 1 transmits the information of the product/service purchased in step S101 to the management server 5, together with the value exchange card ID loaded in step S102 (step S103). In this case, if a plurality of value exchange cards 4 are stored in the user terminal 1 as described above, the value exchange card 4 whose ID number has been transmitted may be ejected from the user terminal 1 upon completion of the transmission of the information to the management server 5. In addition, in order to allow the purchaser to visually check the contents of the purchased product/service from the value exchange card 4, the value contents may be printed on the surface of the value exchange card 4.

The management server 5 receives the purchase information and value exchange card ID transmitted from the user terminal 1 in step S103 (step S201), and stores the value exchange card ID and purchase information contents in association with each other (step S202). With this operation, the value exchange card 4 is converted from a state A in which no value is associated with the card into a state B in which the card serves as an "exchange ticket" which proves the right to exchange the ticket for the product purchased by the purchaser or the right to use the service.

When the purchaser is to receive the purchased product or service, he/she brings the value exchange card 4 to the shop. In the shop, the shop terminal 2 loads an ID number from the value exchange card 4 (step S301). The shop terminal 2 then transmits the value exchange card ID read out to the management server 5, and inquires of the management server 5 about the contents of the product/service which is associated with the value exchange card ID and is to be provided for the purchaser (step S302). Upon reception of the inquiry (step S203), the management server 5 searches for the product/service contents associated with the received value exchange card ID, and returns the search result to the shop terminal 2 (step S204).

Upon reception of the inquiry result from the management server 5 (step S303), the shop terminal 2 displays the reception contents on the screen and provides them for a store operator. The store operator hands over the product or provides the service to the purchaser in accordance with the contents provided from the shop terminal 2. Upon completion of handing over of the product or provision of the service, the store operator inputs, to the shop terminal 2, information indicating that the provision of the service to the purchaser is complete (step S305).

Upon reception of the information indicating that the provision of the value to the purchaser is complete from the shop terminal 2 (step S205), the management server 5 discards the information of the product/service associated with the value exchange card ID (step S206). This converts the value exchange card 4 into a state C in which no value is associated with the card.

According to the above description, as in step S103, the user terminal 1 transmits the purchase contents and the value exchange card ID number to the value exchange card management server. However, the present invention is not limited to this. The user terminal 1 may transmit the value exchange card ID number loaded in step S102 to the net shopping site, and the net shopping site may transmit the value exchange card ID number and purchase information to the management server 5.

Figure 3:
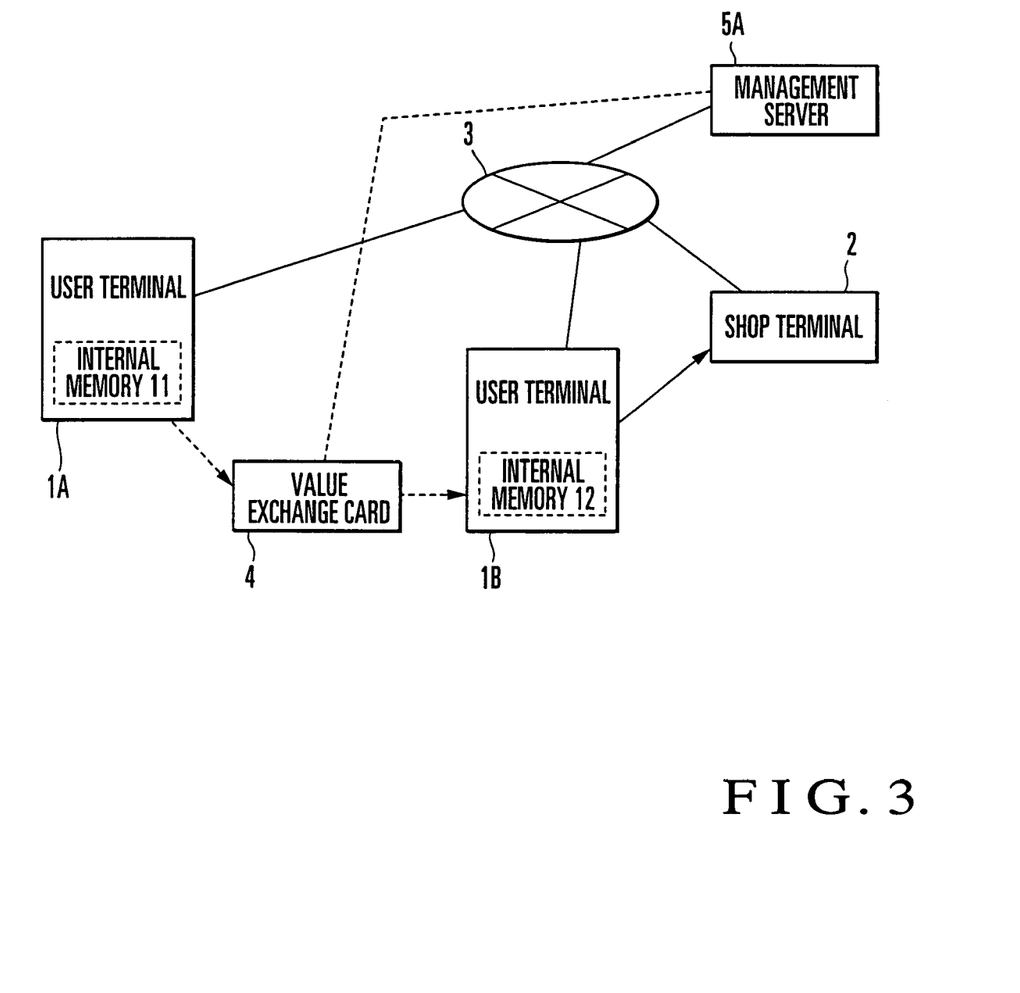
FIG. 3 is a schematic block diagram of a value information management system according to the second embodiment of the present invention.

FIG. 3 shows the second embodiment which can perform value exchange between a plurality of user terminals. FIG. 3 shows the schematic arrangement of this embodiment. The same reference numerals as in FIG. 1 denote the same parts in FIG. 3, and a description thereof will be omitted.

The arrangement shown in FIG. 3 differs from that shown in FIG. 1 in that the arrangement in FIG. 1 is provided with one user terminal 1, whereas the arrangement in FIG. 3 is provided with a user terminal 1A and user terminal 1B. Each of the user terminals 1A and 1B has functions equivalent to those of the user terminal 1 described with reference to FIG. 1. That is, each of the user terminals 1A and 1B has the function of reading out the ID number of a value exchange card 4. Each user terminal also has the function of purchasing a product/service by communicating with a product/service purchase server (not shown) through a network 3. In this embodiment, in particular, the user terminals 1A and 1B are assumed to be terminals which can be carried like cellular phone terminals.

Figure 4:
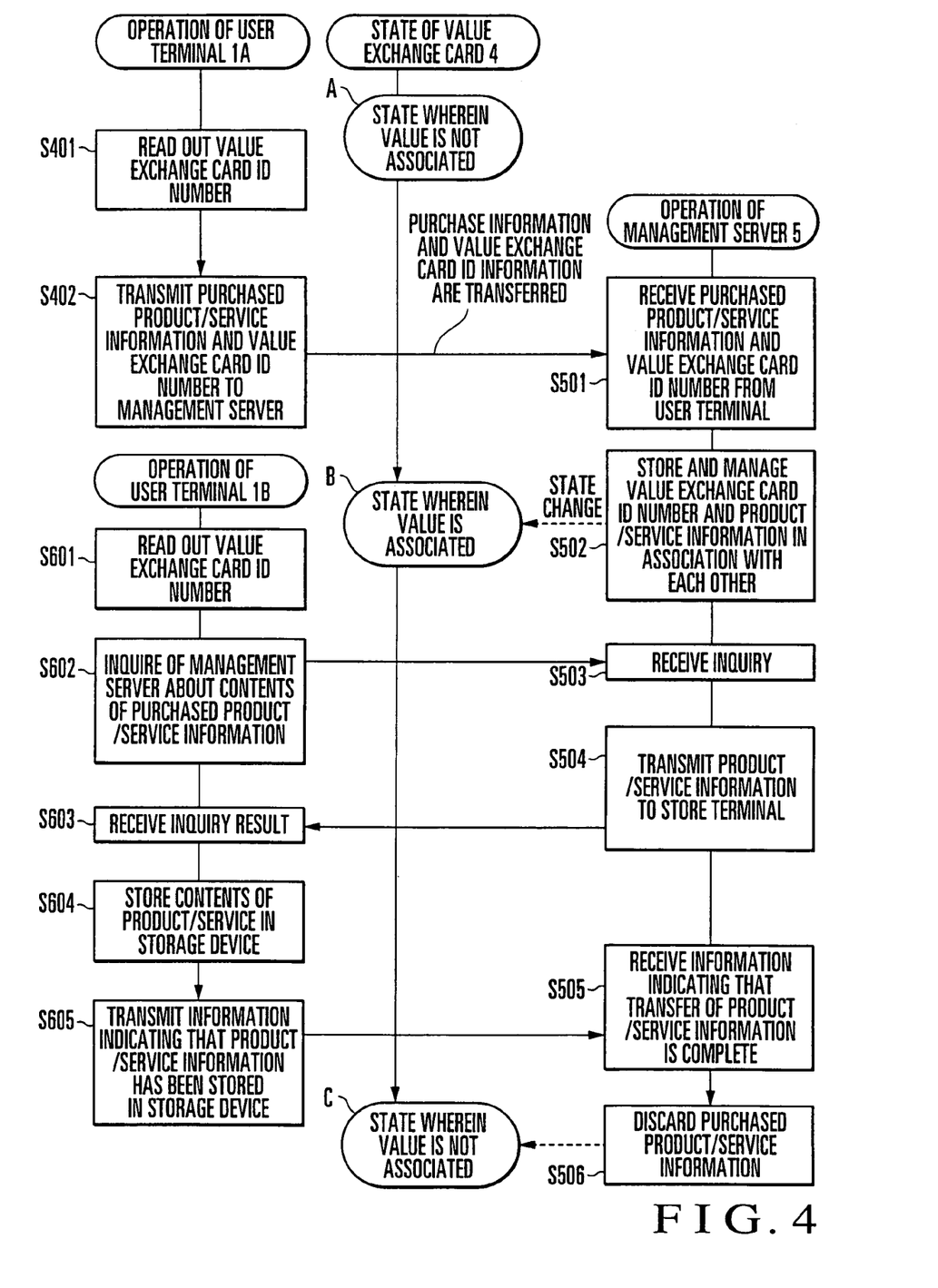
FIG. 4 is a flowchart showing the operation of the value information management system shown in FIG. 3.

Operation to be performed when value exchange is performed between the user terminals 1A and 1B will be described with reference to FIG. 4. Note that a description of processing similar to that in FIG. 2 will be omitted.

First of all, information associated with a purchased product/service has already been stored in an internal memory 11 of the user terminal 1A. For example, the following is the processing to be performed until the information associated with the purchased product/service is stored in the internal memory 11. The user (purchaser) of the user terminal 1A purchases a product/service on a net shopping site by operating the user terminal 1A. In this case, the user may complete payment on the net shopping site or may make payment at another time, e.g., when the purchaser visits the shop.

Furthermore, the user terminal may be a terminal capable of receiving broadcasts. For example, the user terminal allows the purchaser who is to purchase a product/service introduced through a TV broadcast to move to the net shopping site associated with the broadcast information.

Operation to be performed when the information (value) associated with the purchased product/service is moved from the user terminal 1A to the user terminal 1B will be described next. The user terminal 1A as a value movement source loads the ID number of the value exchange card which is associated with the purchased product/service (step S401). If the user terminal 1A is a cellular phone, he/she brings the value exchange card 4 near the user terminal 1A to make the user terminal 1A load the ID number of the value exchange card 4 through a noncontact card reader.

The user terminal 1A transmits the information of the purchased product/service, which has already been stored in the internal memory 11, to the management server 5, together with the ID number of the value exchange card, which has been read out in step S401 (step S402).

The management server 5 receives the purchase information and value exchange card ID number transmitted by the user terminal 1A in step S402 (step S501), and stores and manages the value exchange card ID number and purchase information contents (step S502). At this time, the value exchange card 4 shifts to a state B in which the card is converted into an exchange ticket for the product/service purchased by the purchaser.

The user then moves the value associated with the value exchange card 4 to the user terminal 1B. More specifically, the user terminal 1B of the value movement source loads the ID number of the value exchange card 4 (step S601). The user terminal 1B then inquires of the management server 5 about the contents of the product/service which is associated with the value exchange card ID and is to be provided for the purchaser (step S602). Upon reception of the inquiry in step S503, the management server 5 searches for the product/service associated with the received value exchange card ID number, and provides the search result to the user terminal 1B (step S504).

Upon reception of the search result (step S603), the user terminal 1B stores the received purchased product/service information in an internal memory 12 (step S604). The user terminal 1B then transmits, to the management server 5, information indicating that the purchased product/service information has been stored in the internal memory 12 (step S605). Upon reception of the information indicating that the movement of the purchased product/service information is complete in step S505, the management server 5 discards the information of the product or service associated with the value exchange card ID (step S506). At this time, the value exchange card 4 is set in a state C in which no value is associated with the card. In this manner, a value is moved from the user terminal 1A to the user terminal 1B.

When the user terminal 1 transmits information to the management server 5 in step S402, the user terminal 1A may transmit information including information (movement destination designation information) for designating the movement of a value to the user terminal 1B. In this case, the management server 5 stores and manages movement destination designation information together with purchase information in association with the value exchange card ID number, thereby performing value movement upon checking whether the movement destination information coincides with the value movement request terminal, when the value is to be moved to the user terminal 1B (steps S503 and S504).

As described above, in this embodiment, since the value (purchase information) stored in the user terminal 1A is moved to the user terminal 1B after the value is extracted to the value exchange card, there is no chance that some terminal other than the terminals concerned with the value exchange will stealthily read the exchange information, unlike a case wherein value movement is performed between the user terminal 1A and the user terminal 1B by using local radio communication (infrared communication, wireless LAN communication, Bluetooth communication, or the like).

Figure 5A:
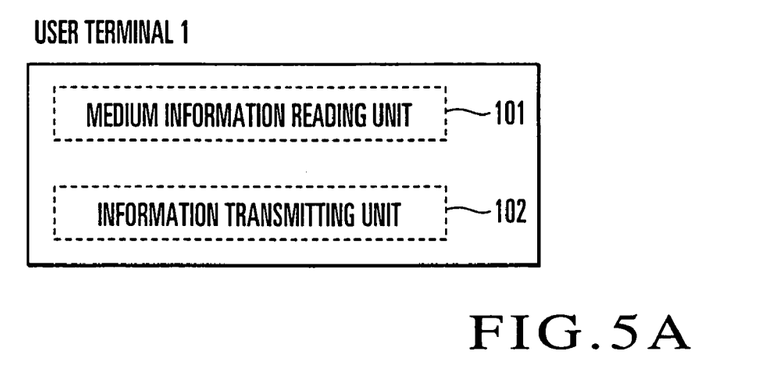
FIGS. 5A, 5B, and 5C are detailed block diagrams of a first user terminal, shop terminal, and management server shown in FIG. 1.
Figure 5B:
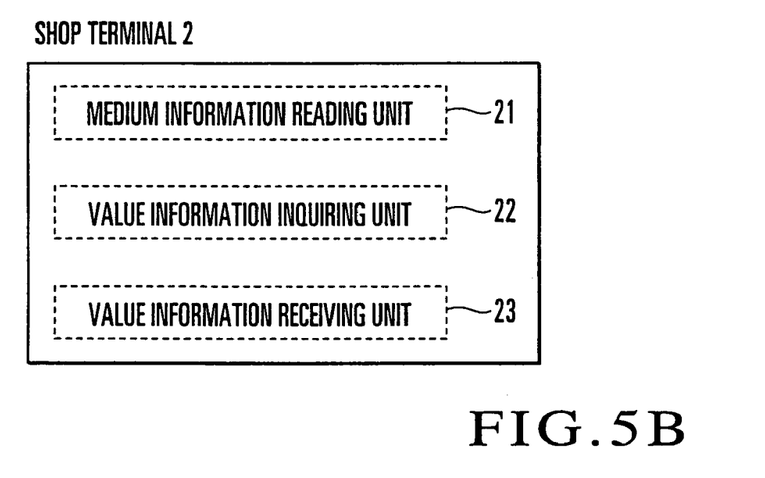
Figure 5C:
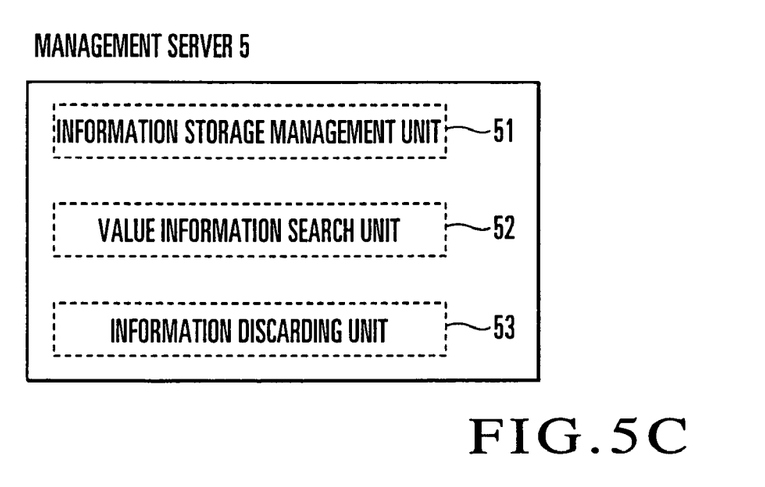

The detailed blocks and operations of the user terminal 1, shop terminal 2, and management server 5 according to the first embodiment will be described next with reference to FIGS. 5A to 5C. As shown in FIG. 5A, the user terminal 1 includes a medium information reading unit 101 which executes step S102 and an information transmitting unit 102 which executes step S103. As shown in FIG. 5B, the shop terminal 2 includes a medium information reading unit 21 which executes step S301, a value information inquiring unit 22 which executes step S302, and a value information receiving unit 23 which executes step S303. As shown in FIG. 5C, the management server 5 includes an information storage management unit 51 which executes steps S201 and S202, a value information search unit 52 which executes steps S203 and S204, and an information discarding unit 53 which executes steps S205 and S206.

Figure 6A:
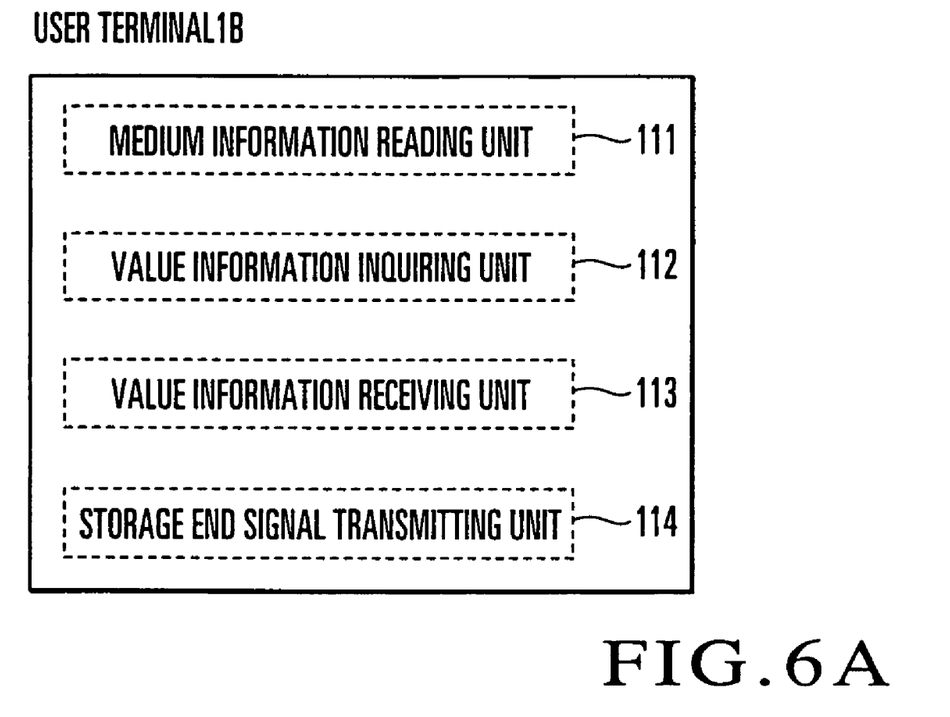
FIGS. 6A and 6B are detailed block diagrams of a second user terminal and management server shown in FIGS. 6A and 6B.
Figure 6B:
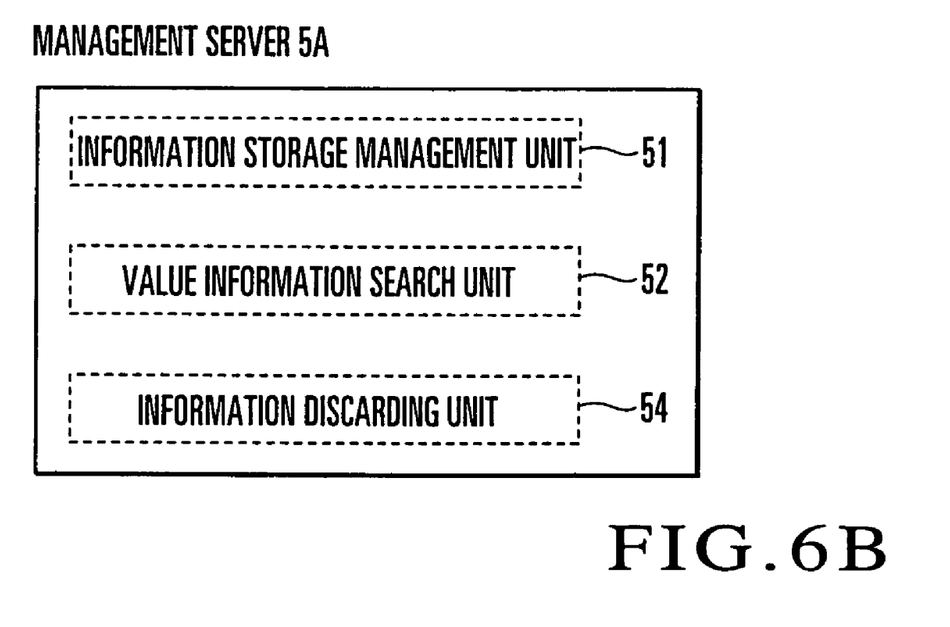

The detailed blocks and operations of a user terminal 1, shop terminal 2, and management server 5 according to the second embodiment will be described next with reference to FIGS. 6A and 6B. As shown in FIG. 6A, a user terminal 1B includes a medium information reading unit 111 which executes step S601, a value information inquiring unit 112 which executes step S602, a value information receiving unit 113 which executes step S603, and a storage end signal transmitting unit 114 which executes steps S604 and S605. As shown in FIG. 6B, a management server 5A includes an information storage management unit 51 which executes steps S501 and S502 similar to steps S201 and S202, a value information search unit 52 which executes steps S503 and S504 similar to steps S203 and S204, and an information discarding unit 54 which executes steps S505 and S506. A user terminal 1A has the same arrangement as that of the user terminal 1 shown in FIG. 5A.

In each embodiment described above, the value exchange card 4 may be a paper or plastic card in which an IC chip which has an ID number unique to the card and allows the ID number to be externally read out is embedded or an object (cellular phone strap, figure, stuffed toy, or the like) in which an IC chip is embedded and which is not limited to the shape of a card. As a method of implementing the value exchange card 4, a method using an RFID may be used. In addition, a plastic card or the like may include a display screen using a liquid crystal, organic EL, or the like and display the value contents of a product, service, or the like associated with the value exchange card to allow the user to check them.

In each embodiment described above, value information associated with the value exchange card 4 is a product/service purchased on net shopping or the like. However, a point (to be provided by a specific shop for a purchaser to incite him/her to visit the shop again) for the reception of a given service or a coupon (e.g., a discount ticket to be provided by a specific shop for the user to incite him/her to visit the shop again).

As has been described above, according to the present invention, since a value purchased on net shopping or the like is associated with a value exchange card to be managed, the purchaser can freely carry the value. This makes it possible for the purchaser to easily transfer the value to another person.

Conventionally, when a user purchases a concert ticket or the like on net shopping, he/she needs to go to the concert hall after receiving an actual ticket by bringing the purchased information to a ticket issuance shop. In contrast, according to the present invention, this operation is equivalent to the user terminal directly issuing a ticket, and hence can save the trouble of receiving a ticket. That is, the purchaser is only required to directly go to the concert hall while brining the value exchange card with him/her.

What is claimed is:

1. A value information management system comprising:
    a storage medium which stores value information representing a value of a product/service purchased through a network, together with ID information;
    a first user terminal which includes reading means for reading information of said storage medium and transmitting means for transmitting the information read by said reading means through the network; and
    a management server which includes storage management means for receiving the information transmitted from said first user terminal and storing/managing ID information and value information in association with each other, and search means for searching for the value information corresponding to the ID information in response to an inquiry sent through the network and returning the value information.

2. A system according to claim 1, further comprising a shop terminal which includes reading means for reading ID information of said storage medium, inquiring means for inquiring said management server, through the network, about value information corresponding to the read ID information, receiving means for receiving the value information returned from said management server in response to the inquiry, and transmitting means for transmitting, to said management server, a signal representing an end of provision of a product/service corresponding to the received value information,
    wherein said management server comprises discarding means for, in response to reception of a provision end signal from said transmitting means, discarding corresponding ID information and value information.

3. A system according to claim 1, wherein said first user terminal comprises an internal memory which stores information read out from said storage medium by said reading means.

4. A system according to claim 1, further comprising a second user terminal which includes reading means for reading ID information of said storage medium which has been transmitted to said management server by said first user terminal, inquiring means for inquiring of said management server, through the network, about value information corresponding to the read ID information, receiving means for receiving value information returned from said management server in response to an inquiry, and transmitting means for transmitting, to said management server, a storage end signal representing that received value information has been stored,
    wherein said management server comprises discarding means for, in response to reception of a value information storage end signal from said transmitting means, discarding corresponding ID information and value information.

5. A system according to claim 4, wherein said second user terminal comprises an internal memory which stores information received from said management server.

6. A system according to claim 1, wherein said storage medium comprises a radio frequency identification (RFID) card.

7. A system according to claim 1, wherein said first user terminal comprises a portable communication terminal.

8. A value information management method, comprising:
    the step of a first user terminal transmitting value information representing a value of a product/service purchased through a network to a management server through the network, together with ID information read out from a storage medium;
    the step of the management server receiving information from the first user terminal and storing and managing ID information and value information in association with each other; and
    the step of the management server searching for and transmitting value information corresponding to ID information in response to an inquiry through the network and returning the value information.

9. A method according to claim 8, further comprising:
    the step of a shop terminal reading ID information of the storage medium and making an inquiry about value information corresponding to ID information read by the management server through the network;
    the step of the shop terminal receiving value information returned from the management server in response to the inquiry;
    the step of the shop terminal transmitting to the management server a signal indicating an end of provision of a product/service corresponding to value information; and
    the step of the management server discarding ID information and value information in response to reception of a provision end signal from the shop terminal.

10. A method according to claim 8, further comprising:
    the step of the second user terminal reading ID information of the storage medium and inquiring of the management server about value information corresponding to the read ID information through the network;
    the step of the second user terminal receiving value information returned from the management server in response to an inquiry;
    the step of the second user terminal transmitting a signal containing value information from the management server to the management server; and
    the step of the management server, in response to a value information storage end signal from the second user terminal, discarding corresponding ID information and value information.

11. A method according to claim 8, wherein the storage medium comprises an RFID (Radio Frequency Identification) card.

12. A method according to claim 8, wherein the user terminal comprises a portable communication terminal.

* * * * *